US006108035A

United States Patent [19]
Parker et al.

[11] Patent Number: 6,108,035
[45] Date of Patent: Aug. 22, 2000

[54] MULTI-USER CAMERA CONTROL SYSTEM AND METHOD

[75] Inventors: Jeffrey L. Parker; David F. Sorrells, both of Jacksonville, Fla.

[73] Assignee: ParkerVision, Inc., Jacksonville, Fla.

[21] Appl. No.: 08/586,426

[22] Filed: Jan. 6, 1996

Related U.S. Application Data

[63] Continuation of application No. 08/255,257, Jun. 7, 1994, abandoned.

[51] Int. Cl.[7] .............................. H04N 5/225; H04N 7/14
[52] U.S. Cl. .............................. 348/169; 348/20; 382/103
[58] Field of Search .............................. 348/13–21, 207, 348/118, 119, 169, 170, 171, 172; 382/103; 396/51, 56

[56] References Cited

U.S. PATENT DOCUMENTS

| | | | |
|---|---|---|---|
| 4,516,156 | 5/1985 | Fabris et al. .............................. | 348/211 |
| 4,945,367 | 7/1990 | Blackshear .............................. | 348/143 |
| 4,974,088 | 11/1990 | Sasaki ...................................... | 348/213 |
| 5,179,421 | 1/1993 | Parker et al. .............................. | 358/113 |
| 5,206,721 | 4/1993 | Ashida et al. ............................. | 348/15 |
| 5,206,732 | 4/1993 | Hudson ..................................... | 348/207 |
| 5,223,875 | 6/1993 | Yanagisawa ............................. | 354/266 |
| 5,268,734 | 12/1993 | Parker et al. ............................ | 358/125 |

*Primary Examiner*—Leo Boudreau
*Assistant Examiner*—Bipin Shalwala
*Attorney, Agent, or Firm*—Arthur G. Yeager

[57] ABSTRACT

A multi-user camera control system with automatic tracking capability for use in video conferencing and similar applications includes a plurality of personal controllers, one for each person utilizing the system. Each personal controller includes a micro-computer controlled keypad and associated communication circuitry as well as optional audio and tracking capability. The controller is programmed with the capability to send commands to the camera system.

The system employs programmed, automatically trackable controllers for issuing commands to control most of the functions of a camera including lens operation. Personal locator devices are electrically connected and can be programmed as a master and as slaves. In addition, a master having override features may be provided, as well as a director's locator device for system wide control.

55 Claims, 20 Drawing Sheets

FLOWCHART 2

FLOWCHART 3

FLOWCHART 4

FLOWCHART 5

FLOWCHART 6

FLOWCHART 7

FLOWCHART 9

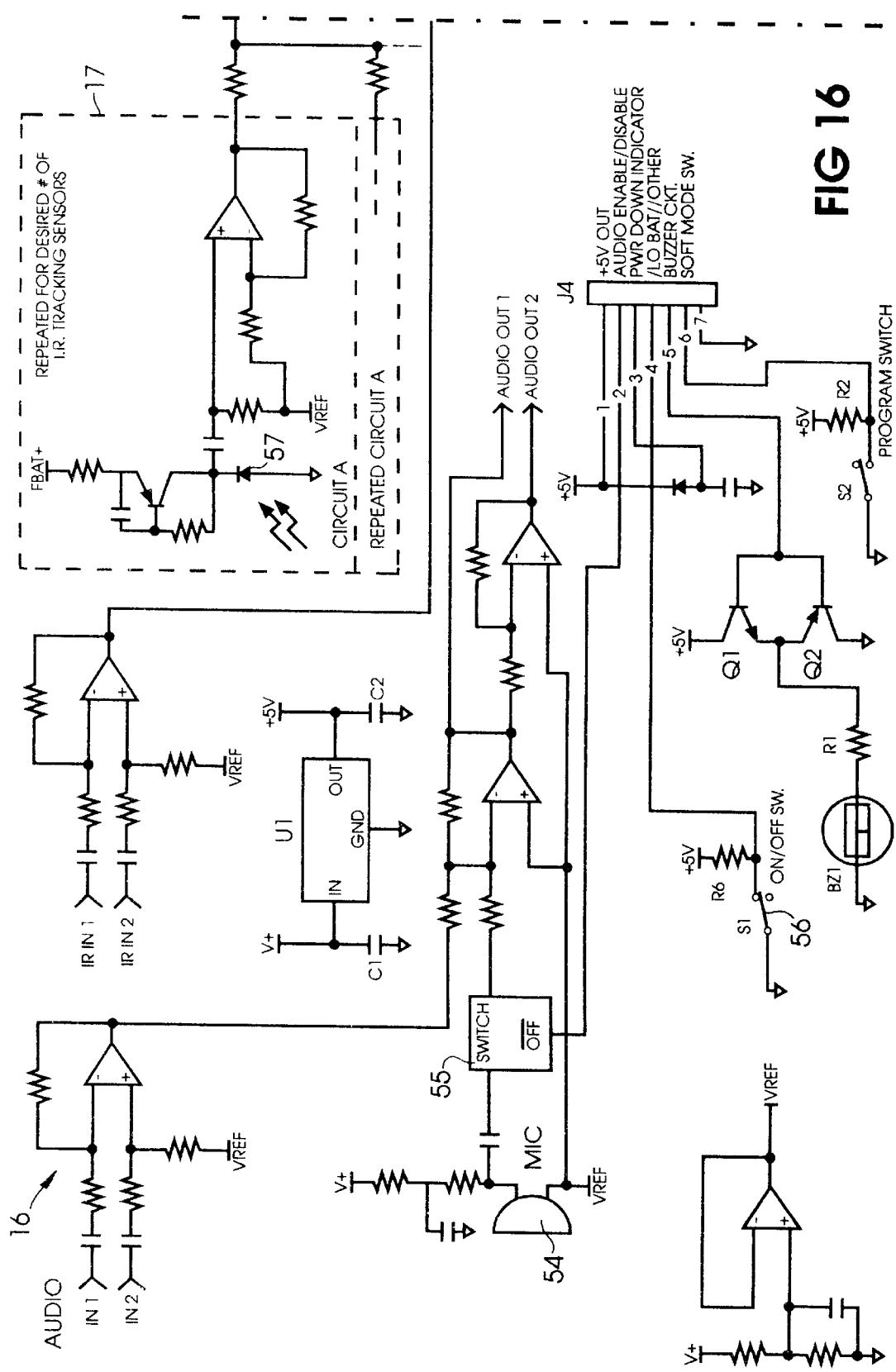

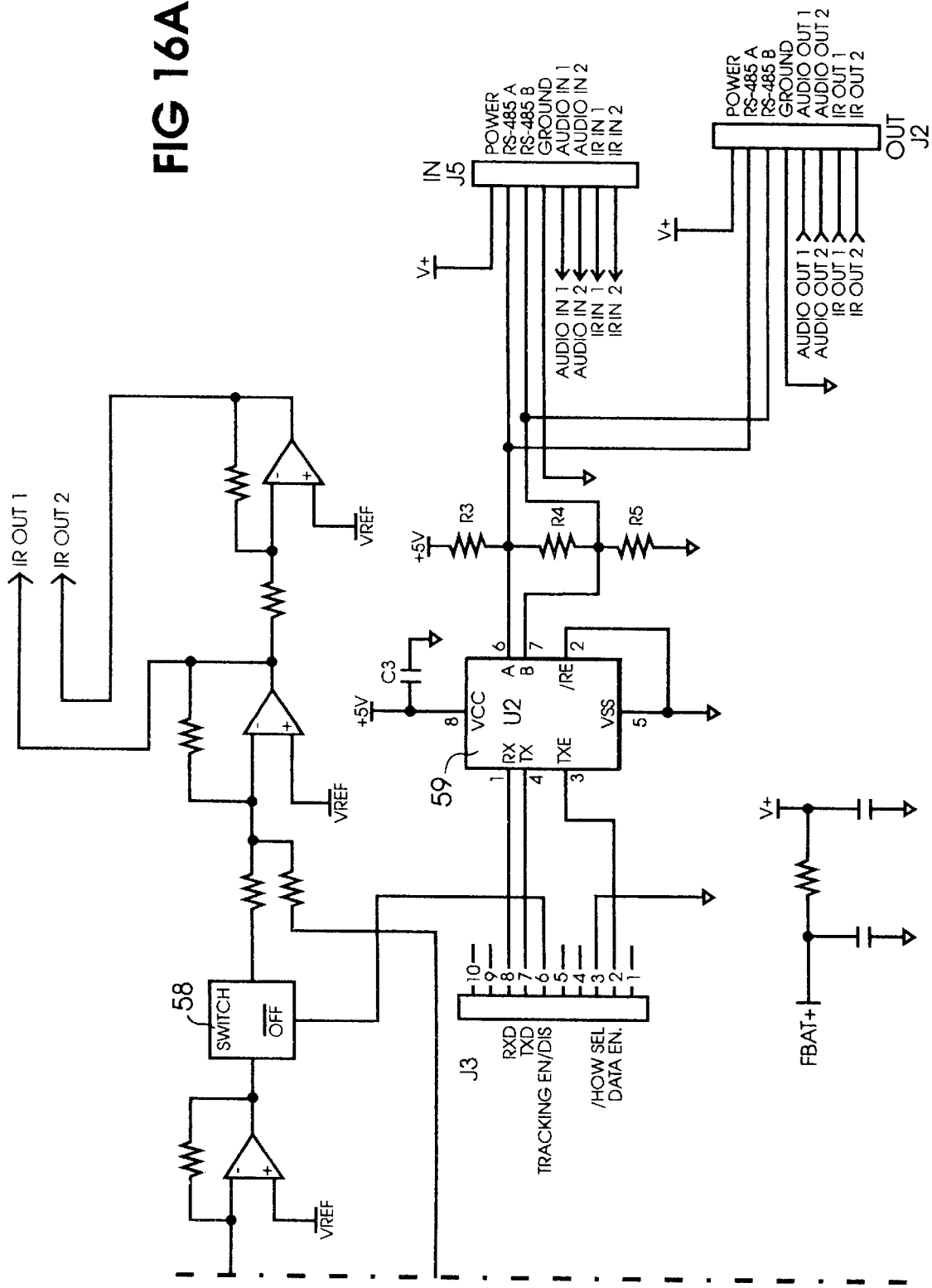

MULTI-USER CAMERA CONTROL SYSTEM AND METHOD

This is a continuation of application Ser. No. 08/255,257 filed on Jun. 7, 1994 now abandoned.

BACKGROUND OF THE INVENTION

1. Field of the Invention

The present invention relates to multi-user camera system control particularly for use in video teleconferencing systems, distance learning, audience response, and particularly to user controls for video cameras and associated apparatus in these systems, as well as systems employing automatic tracking capabilities.

2. Prior Art

Current multi-user camera systems in applications such as video conferencing, distance learning, etc. employing cameras have a single point of centralized control with some limited pan, tilt, zoom, and location presents. Having a centralized control generally requires a facilitator to act as a camera operator. This facilitator must decide who or what will be displayed, select a camera, pan, tilt, and zoom the camera and will require repetition of this process each time someone new takes the floor. An alternative method is to use a wide angle shot of the entire group of people. The primary drawback of this alternative approach is that no one can be seen clearly in such a wide field of view. The facilitator has one more level of control that attempts to solve the multi-user problems; the location presets. By using presets, the facilitator can press a button to position a camera to predetermined pan, tilt, and zoom settings, and must still decide when, who and what to display. These location presets still require the presence of the facilitator who must still attempt to follow the conversation(s) via the use of location presets for the participants in the group.

What is needed is a system that solves these problems by providing a distributed control architecture to the participants,, in place of or to compliment a centralized controller for the facilitator. Each person involved would have a single person user interface which allows control of the desired view of each person or anything else to be displayed. When a person wants to speak, a command can be sent and a camera is directed to such person, allowing a face to face conversation or allowing the display of of a predetermined view. Now each person can be seen clearly and at the proper time. This eliminates the facilitator's guess work of who or what to display. One-on-one conversations now become the rule rather than the exception. When appropriate, the entire group can be displayed by issuing the appropriate command from any of the individual controllers.

The desired system should include automatic tracking capability so that when the appropriate command or commands are sent, the system will automatically locate the user controller, automatically select a camera, and automatically select the desired field of view of the camera based on the user's location in the system area. Also, pan, tilt, zoom and iris of the camera may be made and remembered automatically without the assistance of the facilitator.

SUMMARY OF THE INVENTION

In one aspect of the present invention there is provided a method of controlling the field of view variables of a camera in a system including a camera, a means for adjusting the field of view variables of the camera and at least two remote control devices capable of sending commands to the means for adjusting the field of view variables of the camera comprising the steps of: remembering at least two specific fields of view of the camera; issuing a field of view command from at least one remote control device; and moving the field of view of the camera to one of the fields of view so remembered. In other aspects of the invention, commands are issued from each of the remote control devices to remember different fields of view of the camera; and remembering the remote control device that issued the respective command. Other steps include moving the field of view of the camera to the field of view remembered associated with the remembered remote control device that issued the respective command; remembering the position of the camera with respect to a known reference; remembering the position in a first plane; and remembering the position of the camera in another plane.

The present invention also provides the steps of: remembering the zoom perspective of the camera; remembering the focus position of the camera; remembering the iris position of the camera; moving the position of the camera to the remembered position; changing the zoom perspective of the camera to the remembered position; moving the focus position of the camera to the remembered position; and issuing a command by one of the remote control devices to override commands from other remote control devices affecting the field of view of the camera.

A further aspect of the present invention provides a method of controlling the field of view controls of each camera in a system including at least two cameras, a means for controlling the variables that define the field of view of each camera and at least two remote control devices capable of sending commands to each means for controlling the field of view variables of the respective camera comprising the steps of remembering at least one field of view of each camera; issuing a field of view variable command from at least one of the remote control devices to the means of controlling the cameras; and changing the field of view variables of the camera associated with the field of view remembered to provide the field of view remembered. Other steps include issuing commands from each of the remote control devices to remember a different field of view of the camera; remembering the remote control device that issued the respective command; changing the field of view of the respective camera to the field of view remembered associated with remembered remote control device that issued the respective command; remembering the position of each camera with respect to a known reference; remembering the position of each camera in two planes; remembering the zoom perspective of each camera; remembering the iris position of each camera; changing the position of the camera associated with the remembered field of view to the remembered position; changing the zoom perspective of the camera associated with the remembered field of view to the remembered perspective; and changing the iris position of the camera associated with the remembered field of view to the remembered position. Also, a command may be issued by one of the remote control devices to override commands from other remote control devices affecting the field of view of any camera, and the method may include automatic tracking.

In another aspect of the invention, there is provided a system for controlling the field of view control variables of a camera comprising a camera, control means for adjusting the field of view control variables of the camera, and at least two remote control devices for sending commands to the control means thereby adjusting the field of view. In addition the field of view control variables of the camera include a position of the camera field of view with respect to a known reference defined by the control means and the control means includes a movable means for movement of the camera in at least one plane. The field of view controls of the camera includes the perspective of the camera, and the control means can change the perspective in response to a first command of one remote control device. The control means including memory means for remembering each field of view command sent by each remote control device, the field of view command including identity information indicative of respective remote control device which send the command, and the control means remembers the identity information to enable the field of view to be moved to one of the fields of view remembered.

In another aspect of the invention the system includes an automatic tracking system means for automatically tracking each remote control device, each remote control means including tracking means trackable by the tracking system means, the control means including memory means for remembering each command received and information indicative of which remote control unit is sending the command.

The invention also includes a method of controlling the field of view control variables of a camera in a system including a camera, a, means for adjusting the field of view control variables of the camera, and at least two remote control devices for sending commands to the control means for adjusting the field of view comprising the steps of: issuing a field of view command from at least one remote control device; and adjusting the field of view of the camera in response to the command. Also, the step of the method may include overriding a field of view command from the one remote control device by a field of view command from the other remote control device. Additionally, each remote control device that issued a respective command is remembered so that the camera field of view may be changed accordingly.

BRIEF DESCRIPTION OF THE DRAWINGS

The novel features, which are believed to be characteristic of this invention, are set forth with particularity in the appended claims. The invention itself, however, both as to its organization and method of operation, together with further objects and advantages thereof, may best be understood by reference to the following description taken in connection with the accompanying drawings in which:

FIGS. 15, 15A and 15B, and 16 and 16A are schematics of the electronic circuitry around which the personal controllers are built;

DETAILED DESCRIPTION OF THE PREFERRED EMBODIMENTS

Figure 1:
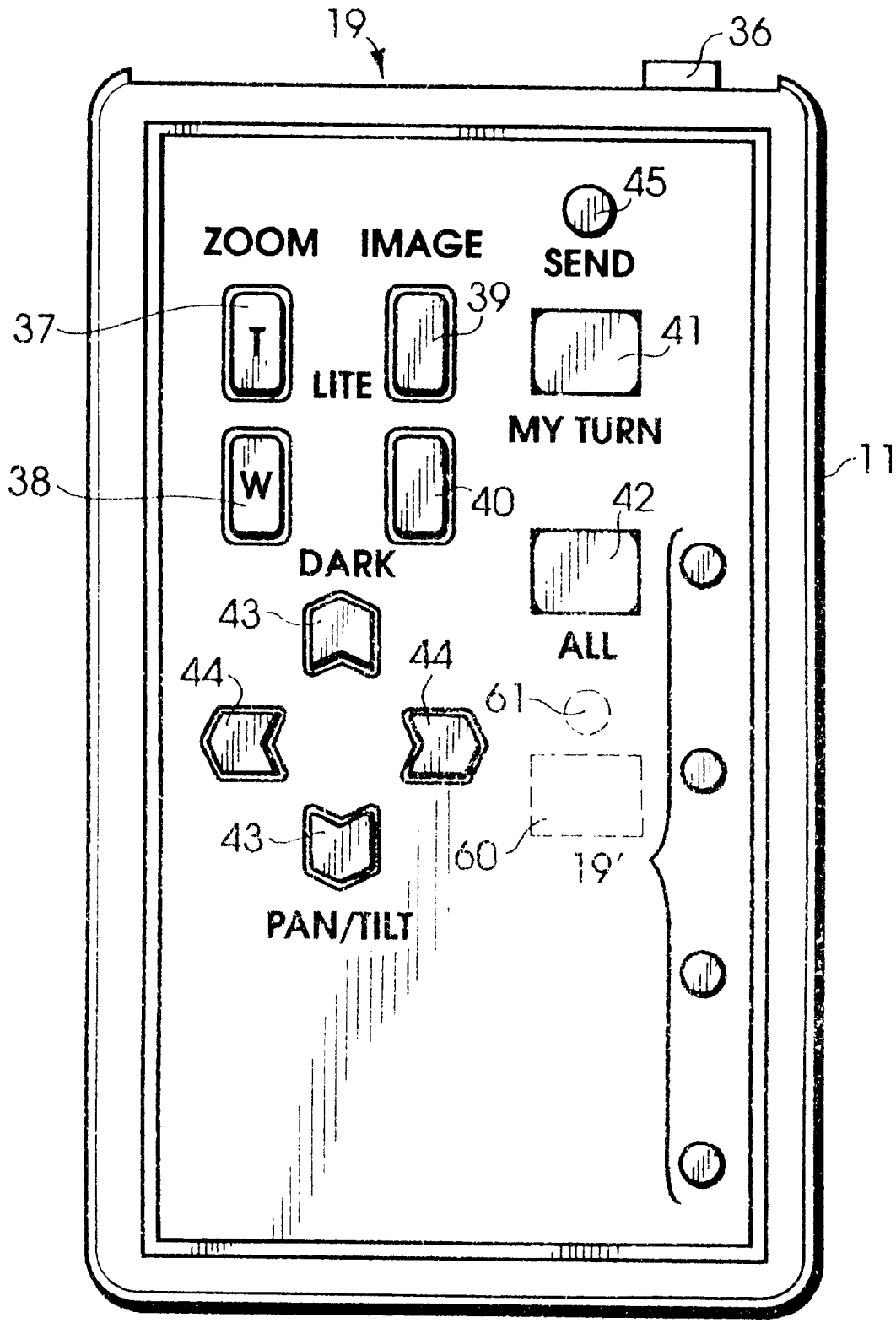
FIG. 1 is a front elevational view of the personal controller or locator used in the present invention.

General Capability The present invention employs a remote tracking system as an option for applications which require remote control of the field of view of a moving picture camera, such as video cameras. A brief review of the design and operation of the prior patent and applications, U.S. Pat. No. 5,268,734, and Ser. Nos. 07/736,729; 07/875,078; and 08/078,434, will be helpful in understanding the technology described herein.

The base unit of the tracking system transmits an infrared signal through a rotating set of lenses or signal shapers designed to structure the IR beam in a predetermined process. The base unit includes a microprocessor, which monitors indicating circuitry to calculate the error from exact alignment between the base unit and the remote unit. The remote unit transmits a signal to the base unit containing information regarding the received IR signal, particularly the instantaneous strength of the signal so that exact alignment may be achieved. The base unit contains computational circuitry to calculate the angle of the structured IR beam relative to the reference angle, usually a degrees or exact alignment. When the received IR signal strength reaches a maximum or "peak" value, the angle of the IR beam relative to the reference angle will be determined by the base unit circuitry. The base unit, upon which a video camera is mounted or an integral part thereof, will be moved according to the programming of the system. Location PRESETS and OFFSETS from the center alignment of the system is also provided.

The remote unit in the present invention is included in a hand-manipulated personal controller or locator used by the subject, and it includes optional RF and audio circuitry. The remote unit communicates infrared tracking information and other signal data to the base unit as well as commands.

System capability also includes field of view controls. A tracking window is defined in the system as the number of degrees from a reference of 0 degrees that the subject may move before the base unit moves. The size of a window may be programmed by the user of automatically controlled by the system. Window size is one of several variables that can be provided for.

The system may provide for "crossover" control, that is movement back and forth from a zero error position into two "error zones", each defined by the respective zero reference planes. These programs provide for no base unit movement during the automatic tracking mode if "crossover" or the "crossover and return" occurs within a predetermined time period, which, preferably, is 1 second. This program also prevents unnecessary movement of the base unit and provides a smoother picture taking by the camera.

The autotrack algorithms are stored in ROM, and operate to track the remote unit if the angular error between the units is determined to exceed a preset number of degrees.

The base unit will not move to correct the angular error if the subject is within the preset window. If the subject moves out of the preset window, the base unit will move to correct the error. When the error is less than a predetermined amount and the subject is not moving, the window will be reinstated and the base unit will cease movement until the error exceeds the predefined window. A dual window method utilizing a time-based ramp-up method of handling the transition between a stationary situation and the autotracking mode may also be included.

As discussed in the cited patent and applications, the PAN and TILT optics are rotated by a mechanical drive, which also supplies interrupts 1 and 2 to the microprocessor for the START and END of PAN and TILT respectively. In the prior and present system, PAN scans alternate with TILT scans. For each scan, the IR output signal strength is known and the return signal contains information regarding the signal strength at the remote unit. Using the inverse square law (see application Ser. No. 08/078,434) as understood in the art, it is possible to compute the distance between the remote unit and the base unit to a given accuracy depending upon the system specifications.

The previous system also includes control capability for the ZOOM, FOCUS and IRIS functions of a camera, as in the above co-pending applications, and the integration of those functions with the other capabilities of the present system.

SYSTEM DESCRIPTION

Personal Locator

Figure 2:
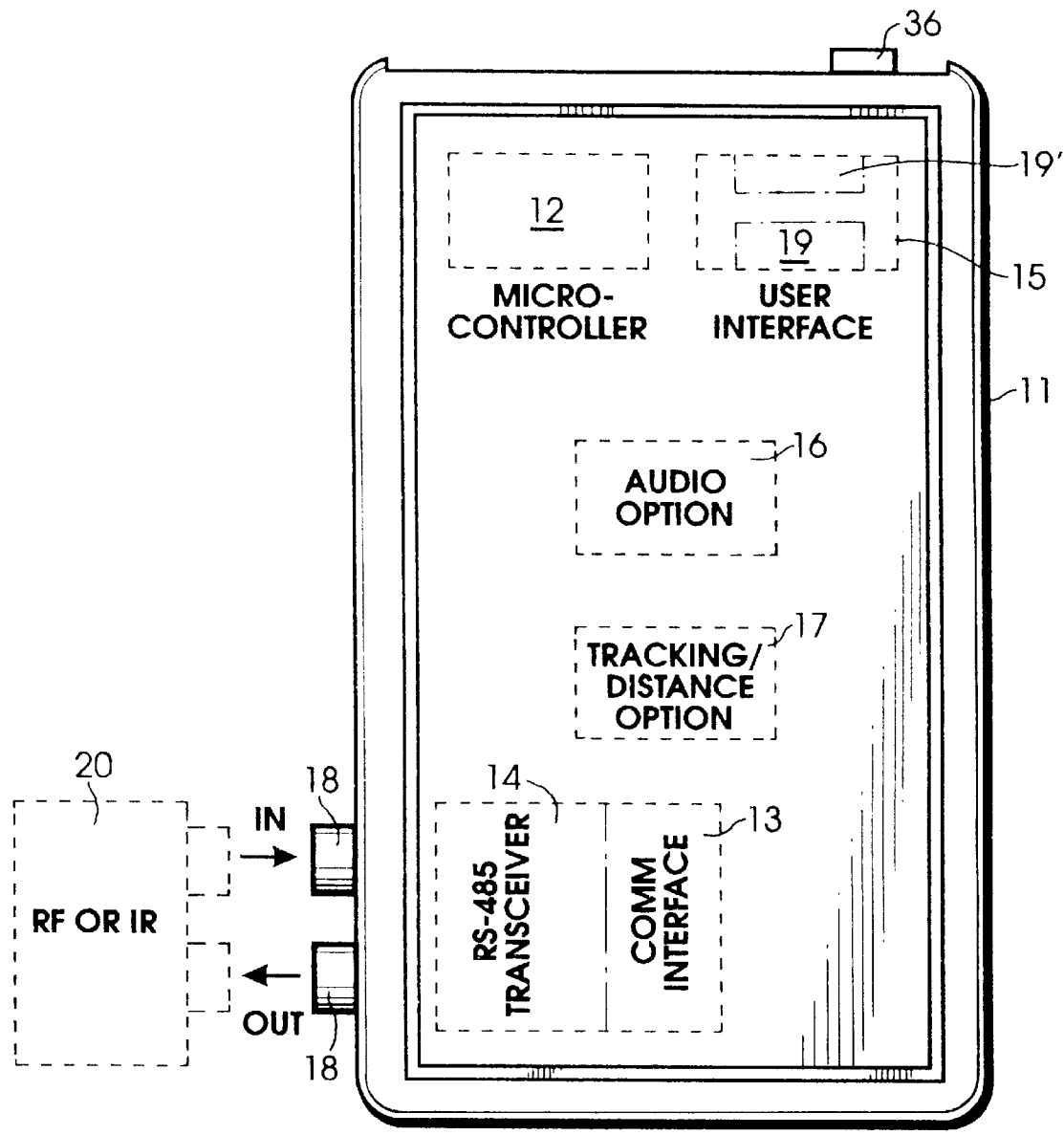
FIG. 2 is a pictorial block diagram of the electronic circuitry of the personal locator of FIG. 1.
Figure 5:
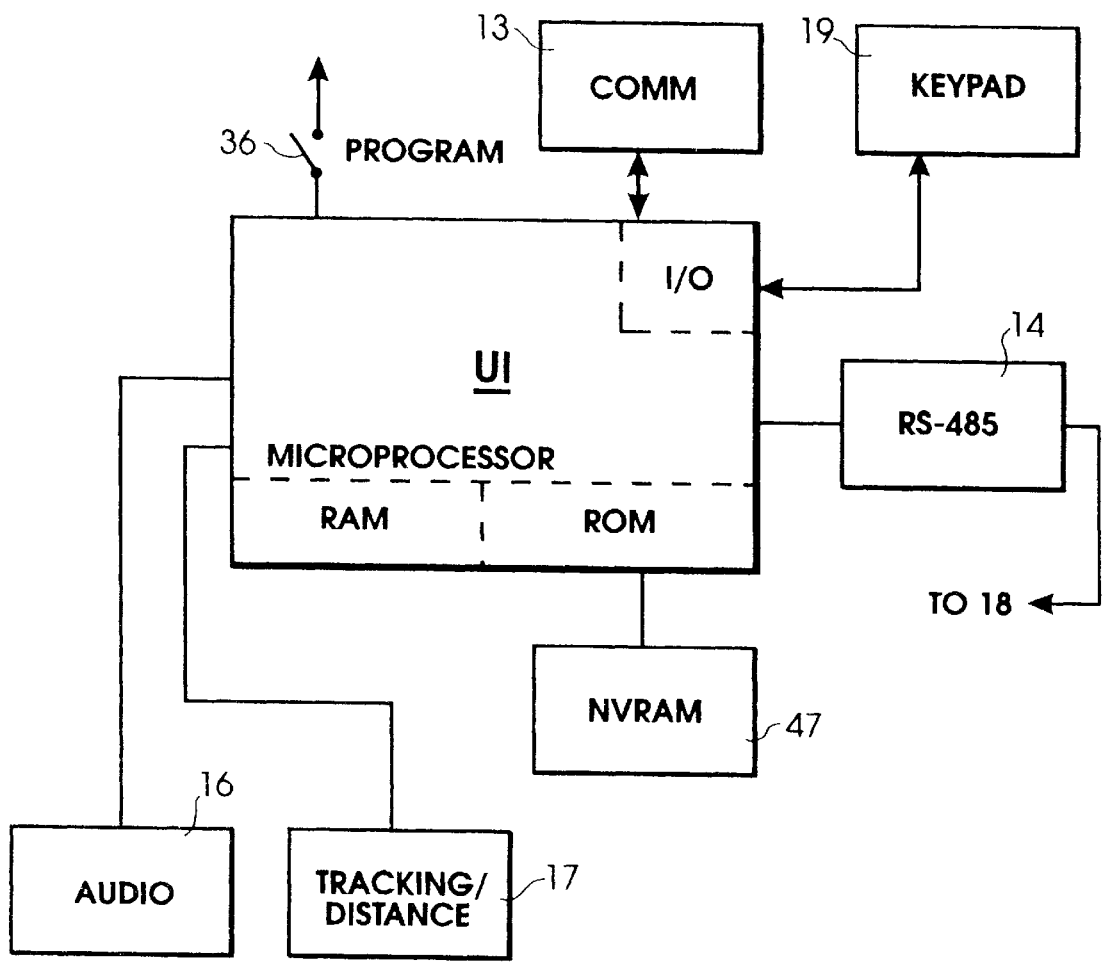
FIG. 5 is a block diagram of the micro-computer used in the locator of FIG. 1.
Figure 6:
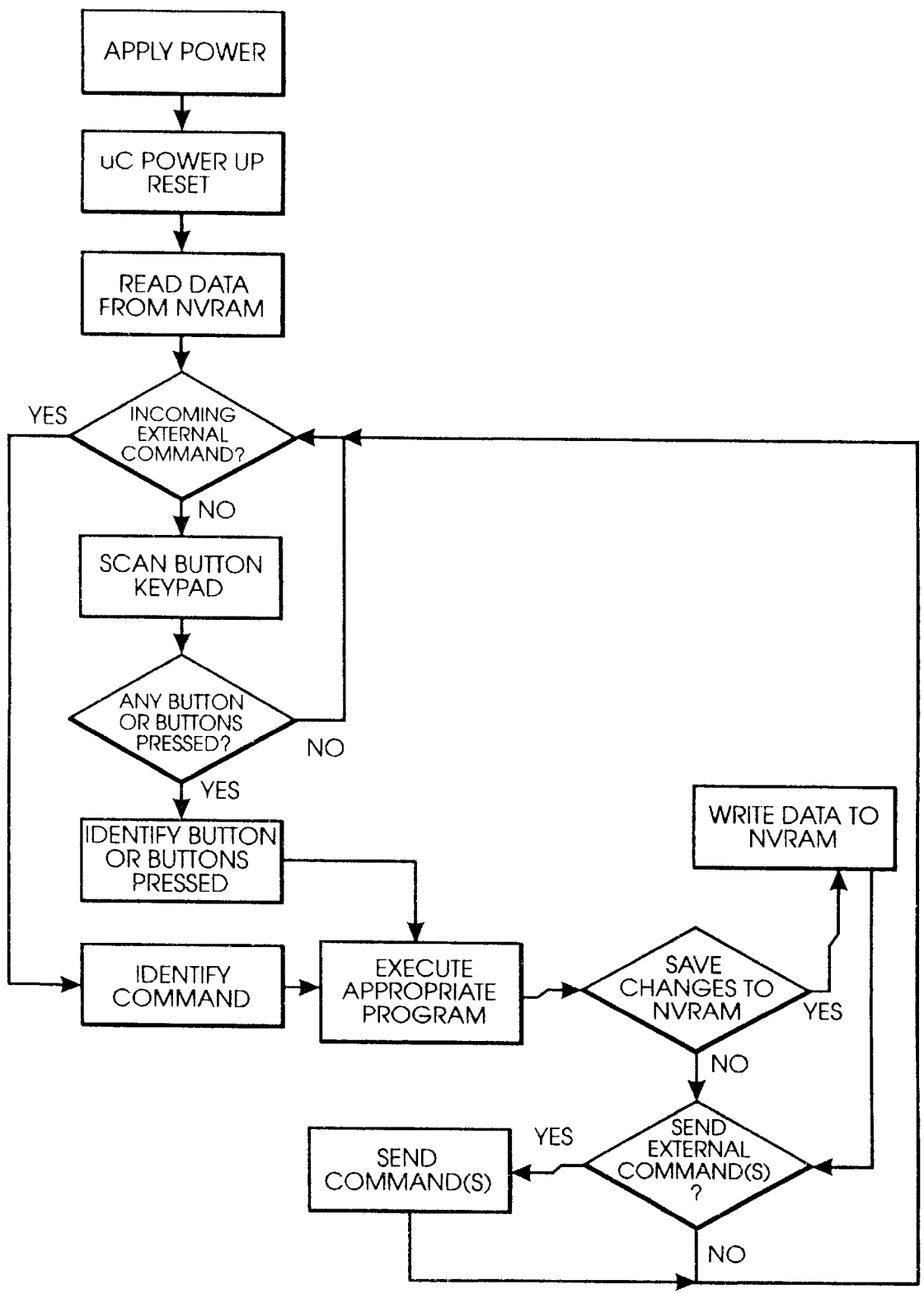
FIGS. 6–14 are flowcharts 1–9 illustrating some of the programming of the present invention.
Figure 7:
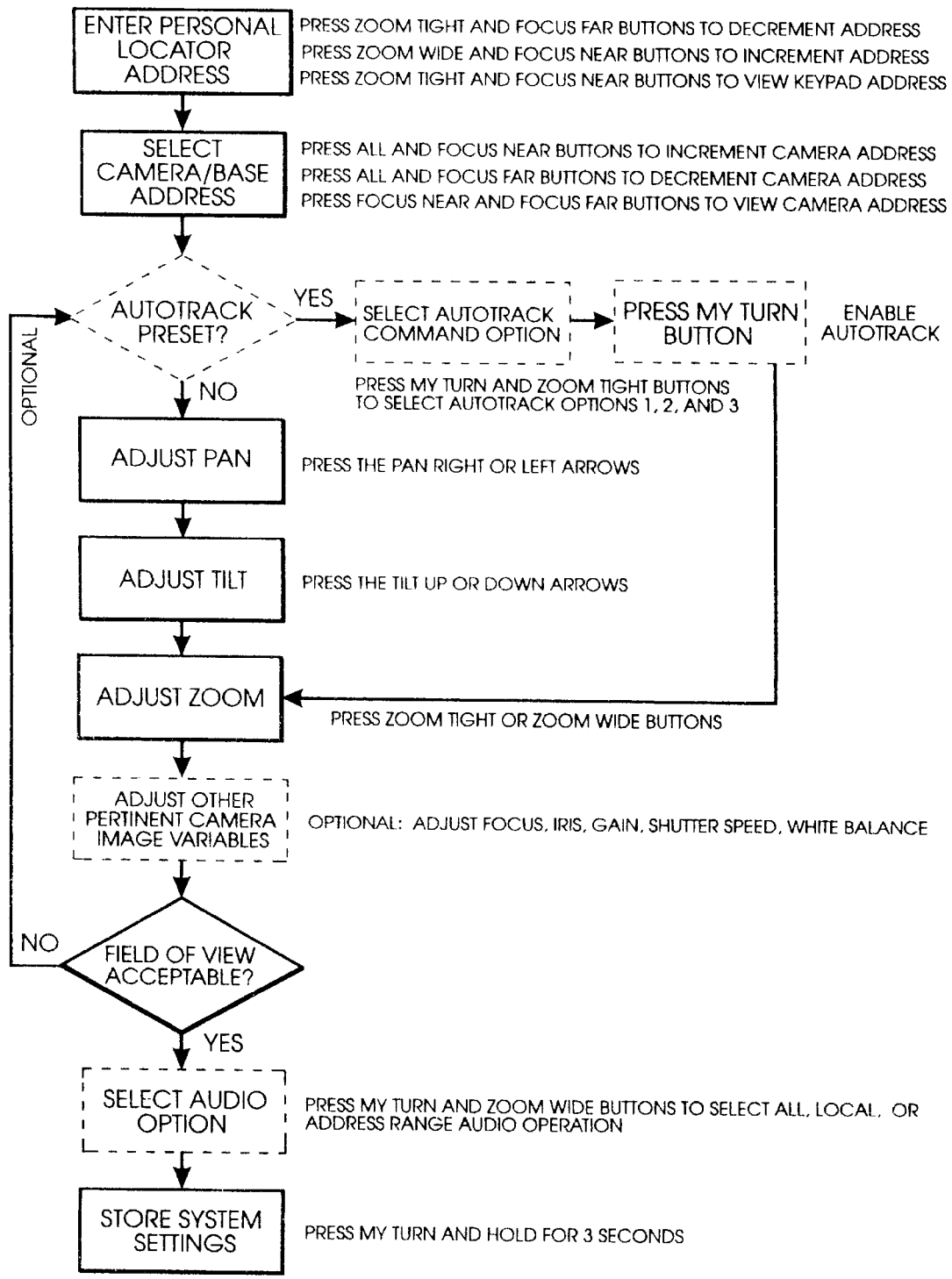
Figure 8:
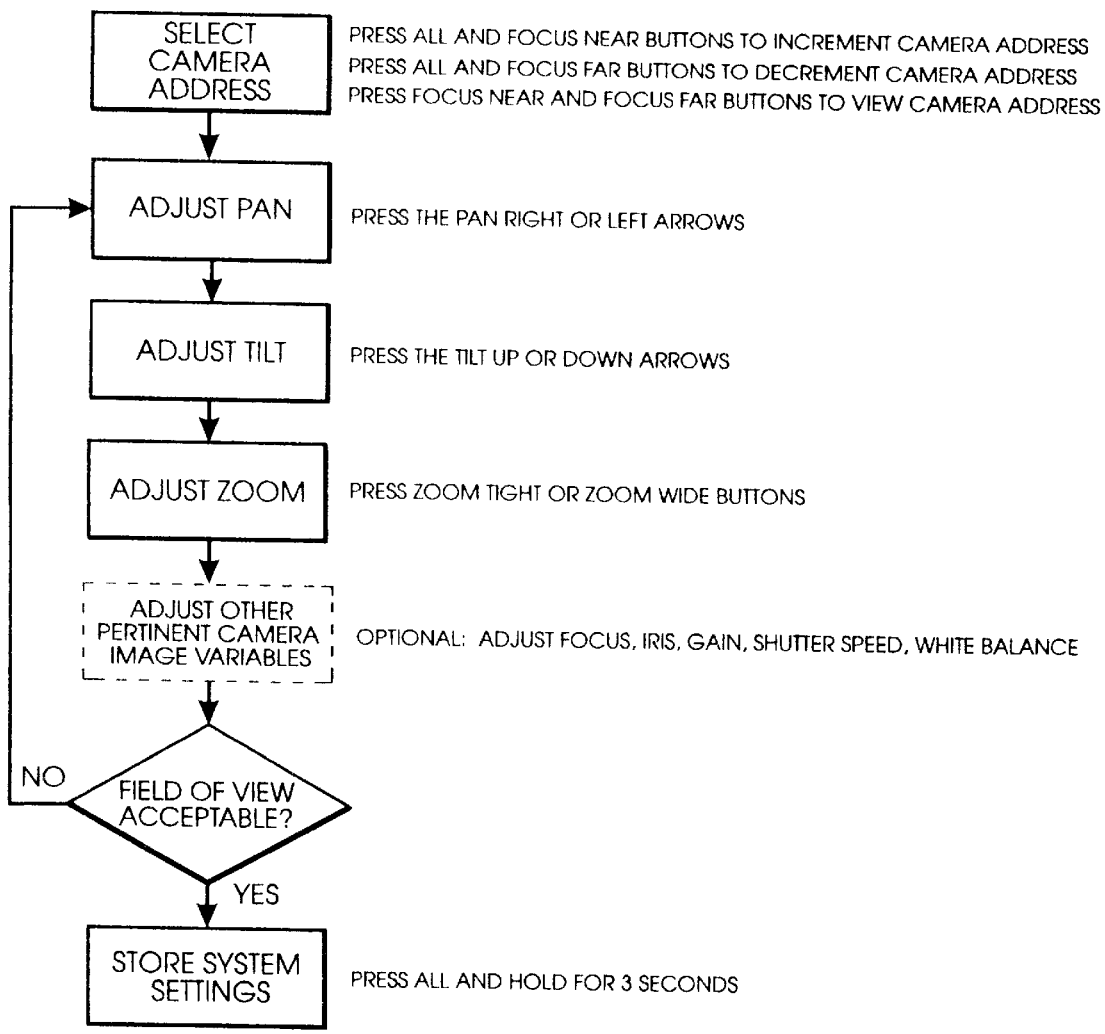
Figure 9:
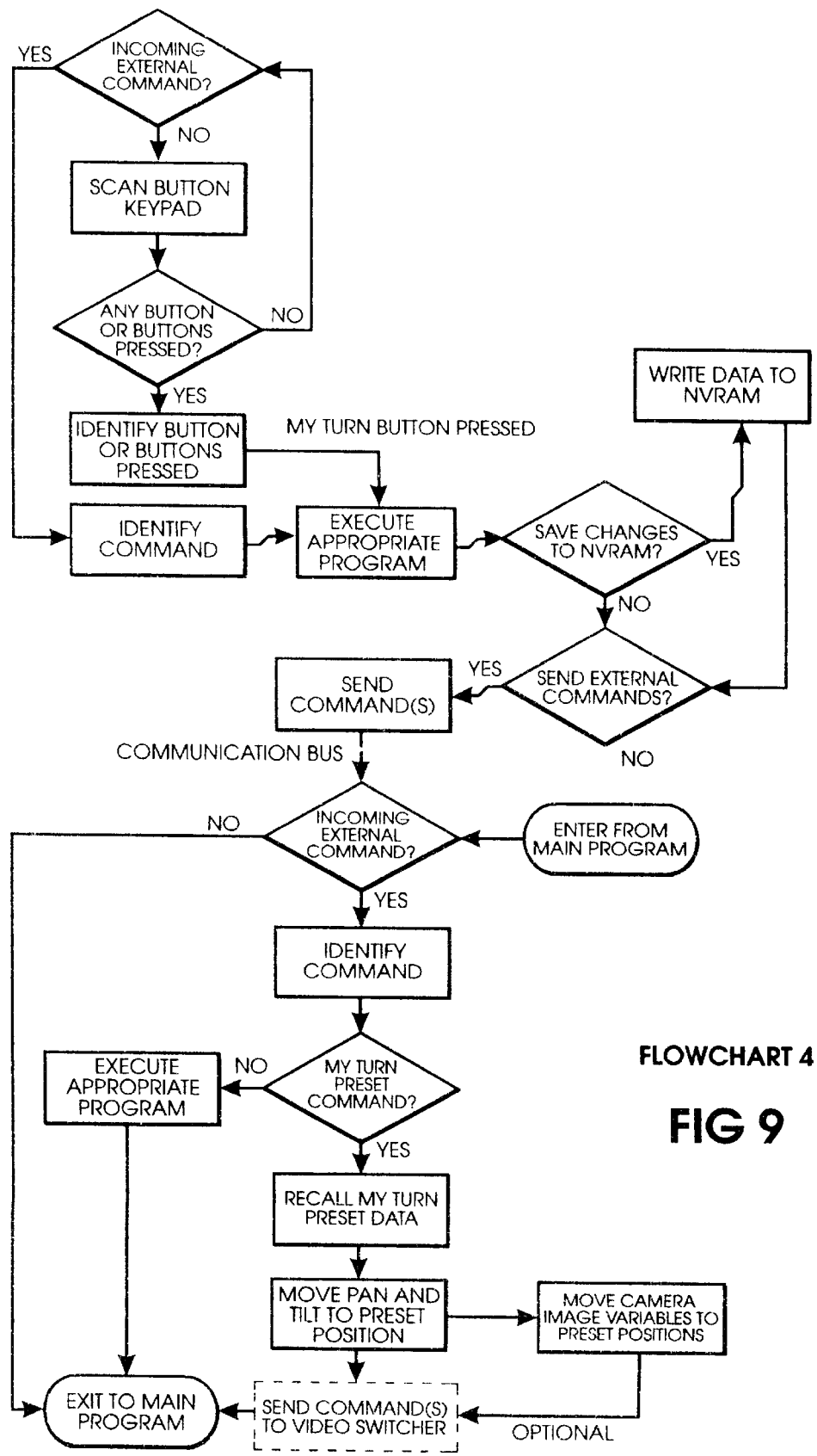
Figure 10:
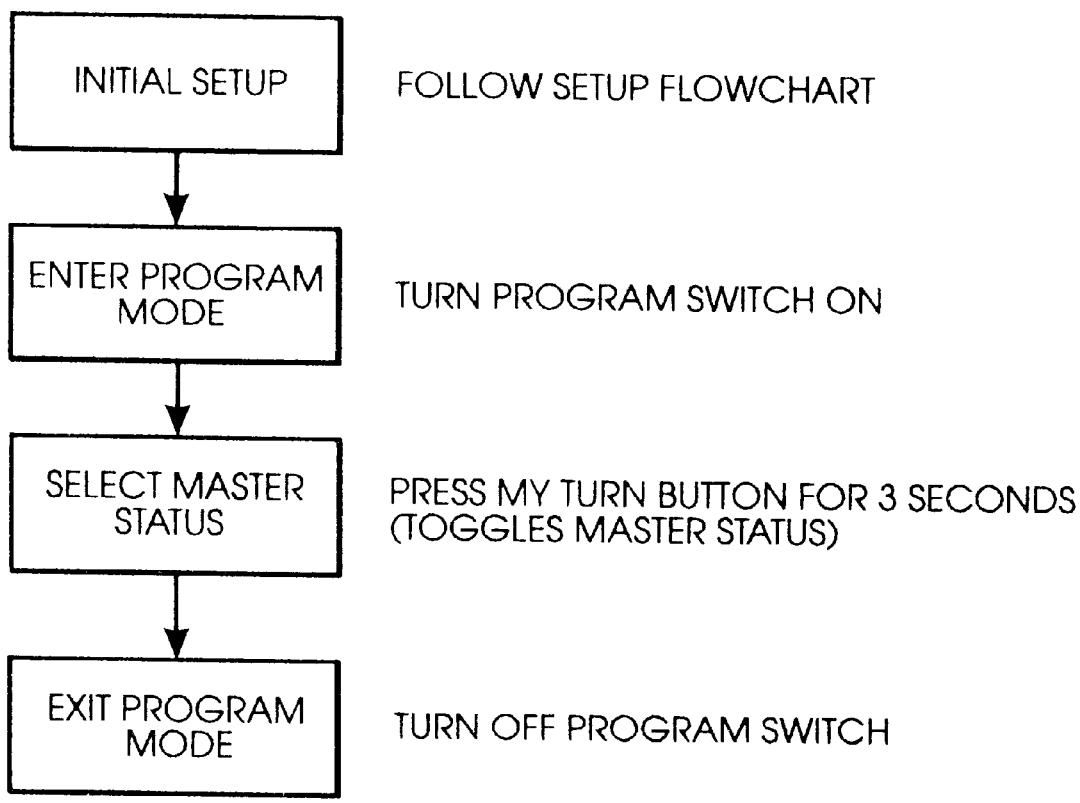
Figure 11:
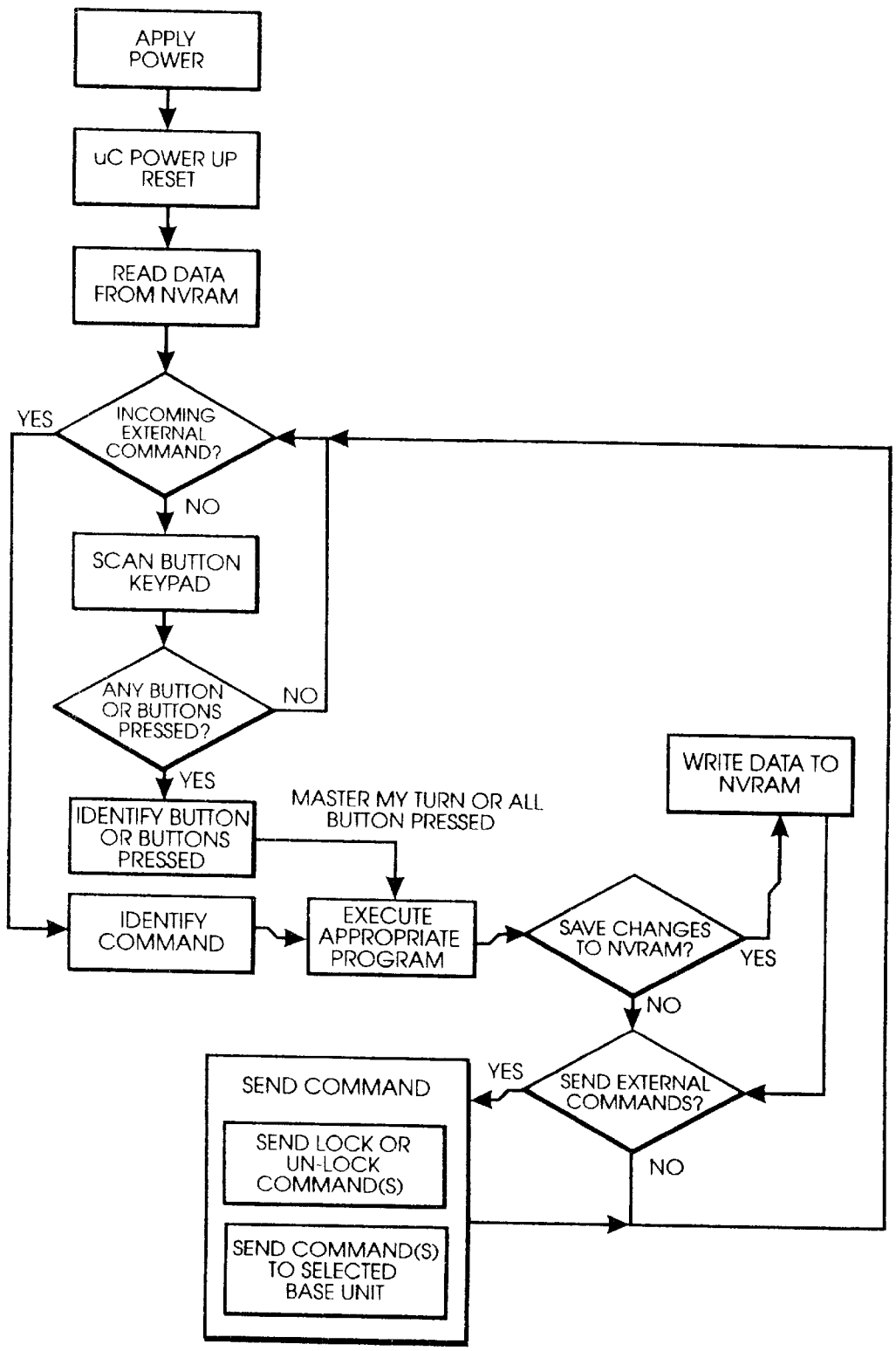
Figure 12:
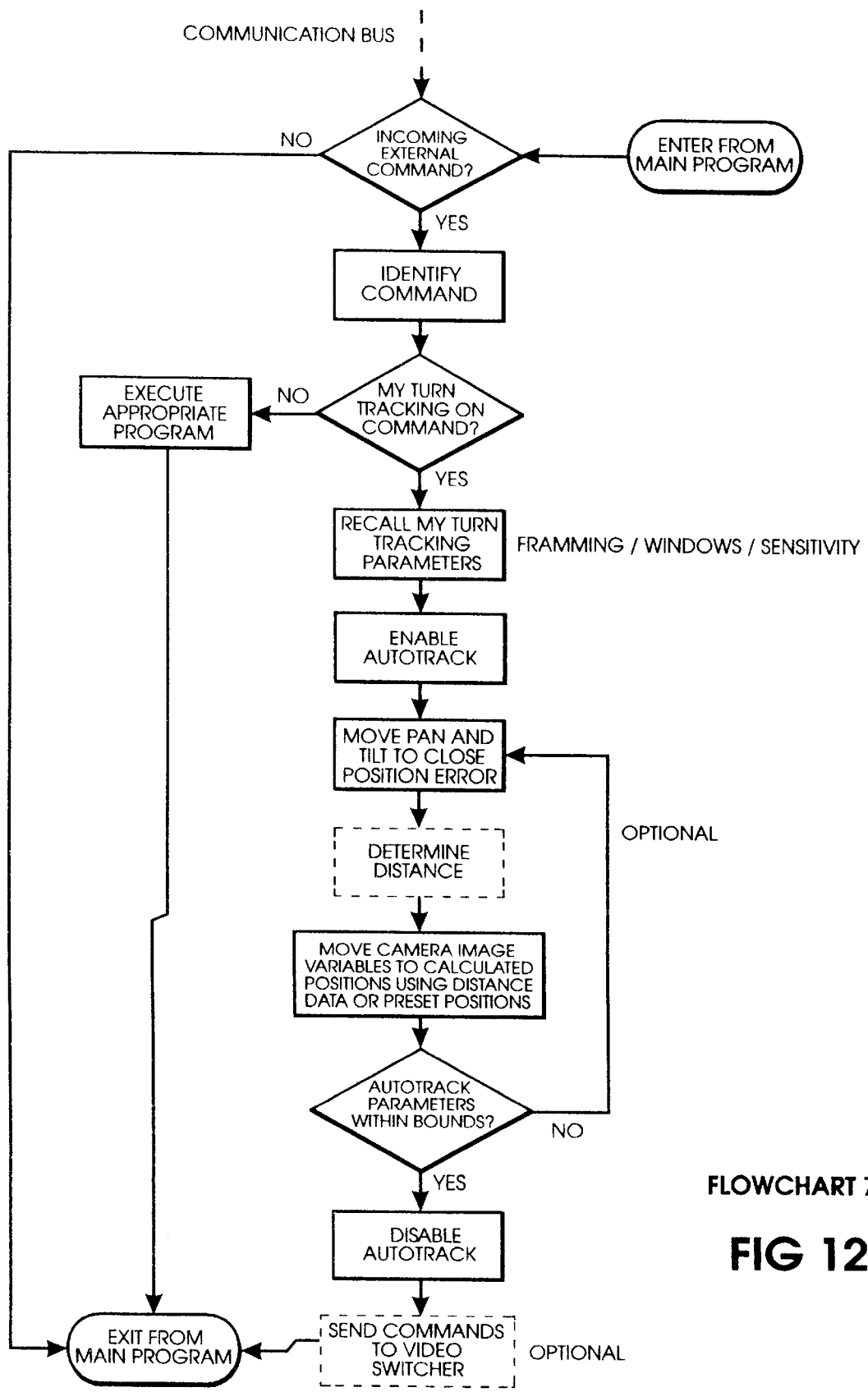
Figure 13:
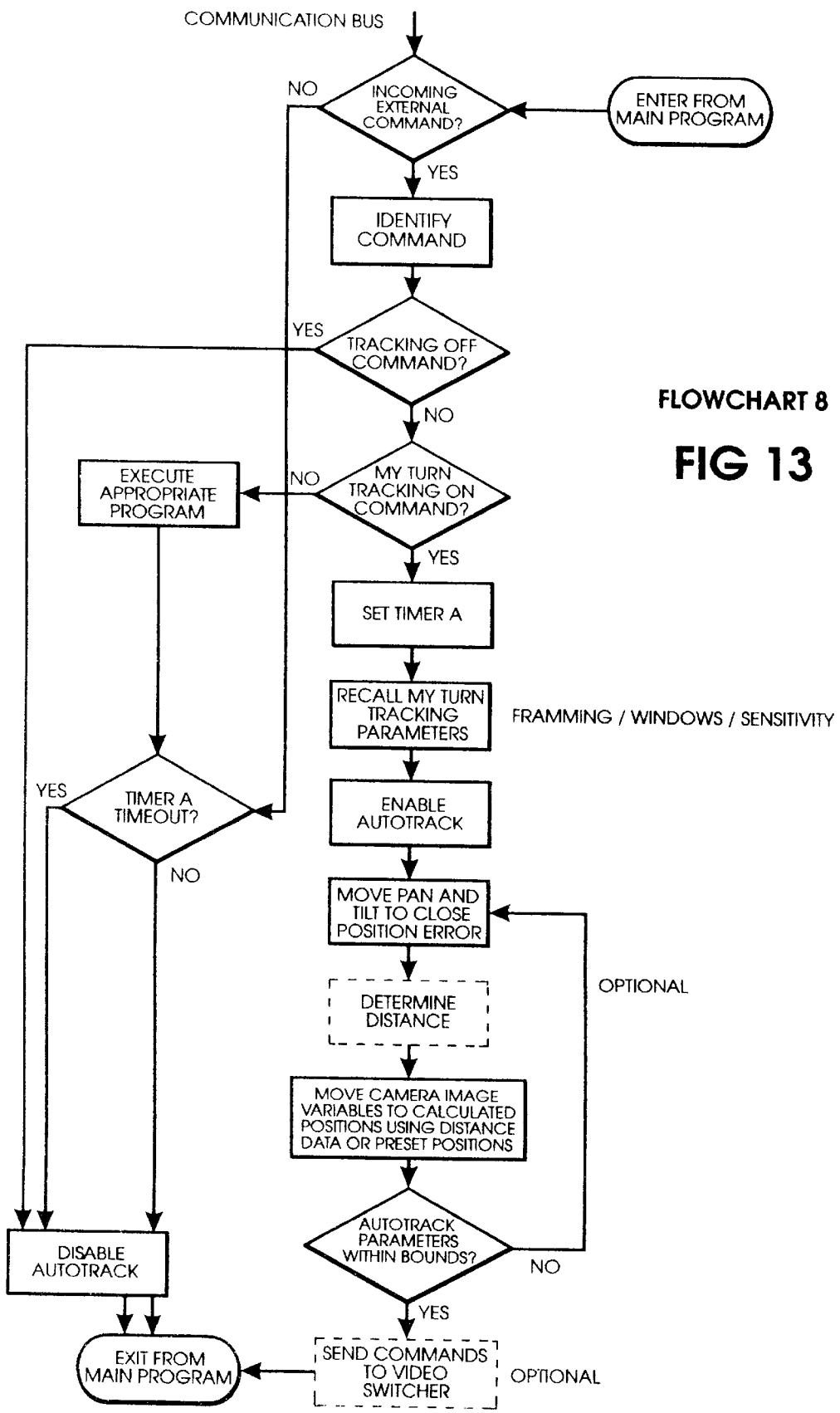
Figure 14:
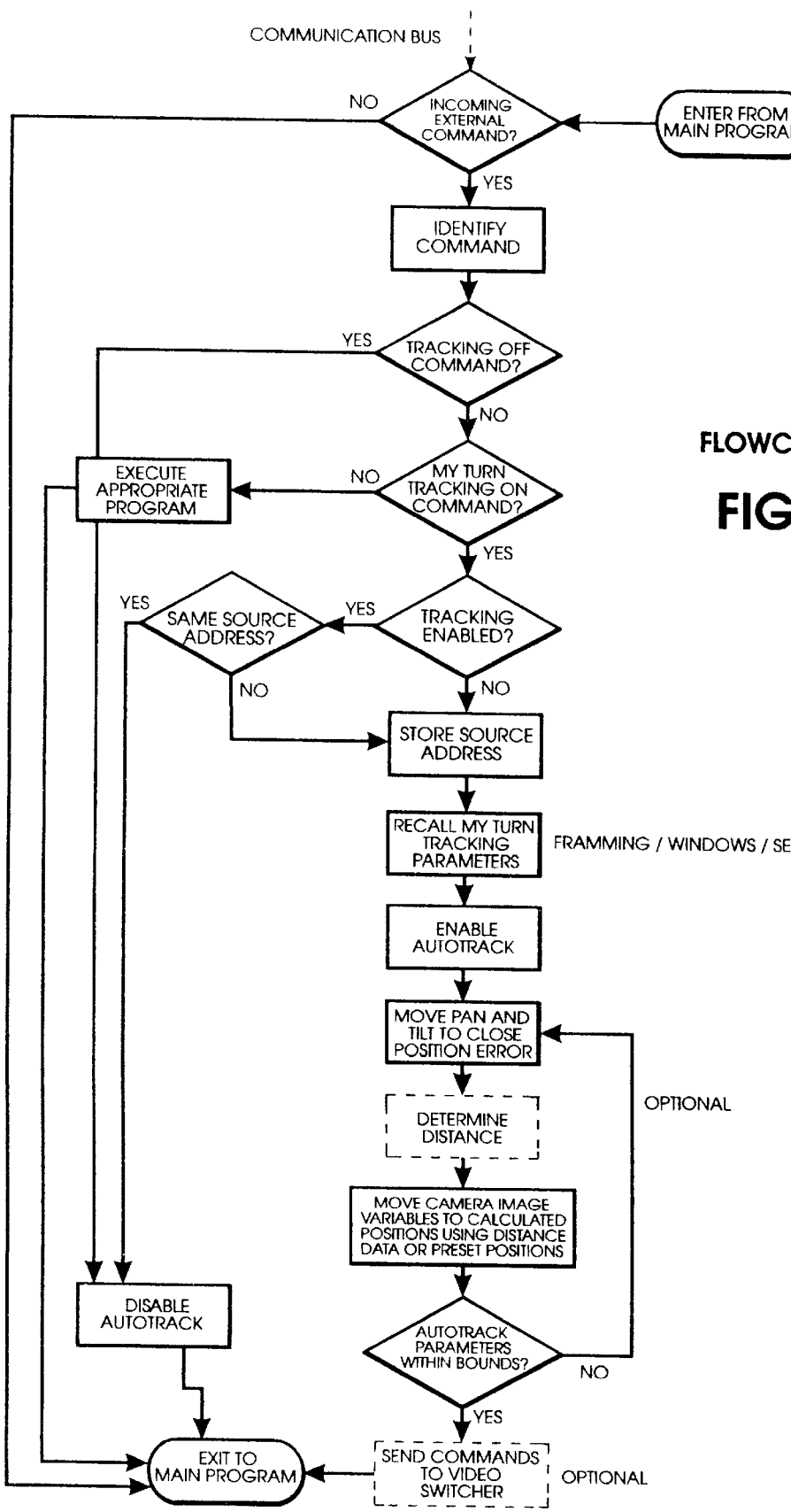

The system 10 employs a keypad device 11, which is a controller and locator, and referred to as a personal locator (PL) in the present system. The PL device 11 always contains the micro-controller 12, the user interface 15, and the communication circuitry 13. The audio 16 and tracking/distance circuitry 17 is optional in a basic configuration of the PL device 11, but are key components of the present system. The electronic circuitry that is contained in a PL device 11 includes all of the necessary components for basic keypad operation as well as the audio 16 and tracking/distance circuitry 17. The PL devices 11 constructed in this manner are hardwired together via input/output interfaces 18. It should be noted that the wire between keypads 19 could be replaced with either an infrared or RF transceiver 20 making the system 10 wireless (FIGS. 1, 2, 5).

Micro-Controller

This micro-controller circuitry 12 contains a microprocessor with internal RAM and ROM, external NVRAM, and the appropriate input/output circuitry. The micro-controller (uC) 12 monitors the user interface 15 and communications 13 to coordinate the Personal Locator internal activities and has the ability to enable/disable the local audio 16 and tracking 17 inputs. The uC 12 is specifically responsible for user programming, user displays, real-time user imput, command generation/reception, and program execution.

User Interface

The interface 15 consists of a button keypad 19, switches 36–44, and indicator lights 19'. The micro-controller 12 uses a button matrix scanning scheme to monitor the button keypad 19. The uC 12 also monitors a program switch 36 for functions which are determined by the current program. The keypad 19 is flexible enough to be configured to support other user interface options such as a LCD display and touch screen input with minor hardware and software changes.

Communications

The hardware electrical configuration of the communication interface 13 is an RS-485 type transceiver and is combined with the hardware and software of uC 12 to create a multiple access, collision detect transceiver, serial communications bus 27.

Audio

The audio microphone and associated audio circuitry 16 can provide sound-at-the-source by issuing a command or commands to the keypad 19. The audio circuitry 16 includes the appropriate amplifiers and filters to deliver audio via a differential hardware link. The differential link is designed in such a manner to support a single-ended or non-differential audio link as well.

Tracking/Distance

The tracking/distance circuitry 17 is similar to that found in the patent and applications cited above, and allows a base unit 21 to locate and track the user with a known or predetermined field of view. The circuitry 17 has provisions for as many tracking sensors as necessary, and the circuitry to enable or disable the tracking signal for each keypad 19 on the bus 27. The tracking signals are carried differentially between keypads 19 and other devices, but are also designed to support single-ended (non-differential) methods. Alternatively, as discussed in the referenced patent and applications, a pair of spaced PAN assemblies allows for distance calculation in accord with the usual trigonometric principles as understood in the art.

System Operation

Figure 3:
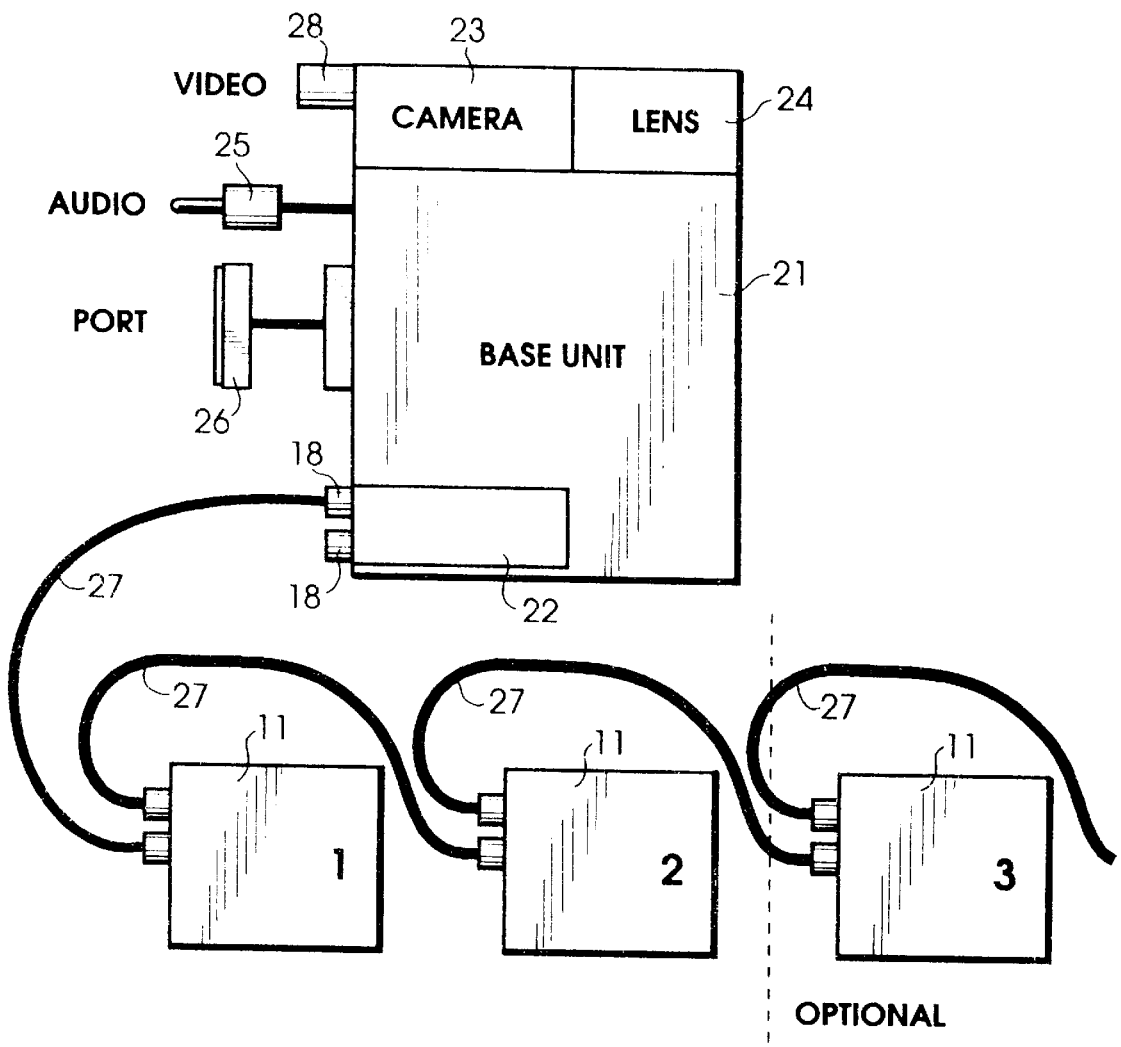
FIG. 3 is a block diagram of one configuration of the multi-user camera system of the present invention.

In the system shown in FIG. 3, the PLs 11 numbered 1, 2 and 3 are configured to incorporate a button keypad 19, interface 15, a microcontroller 12, and a hardwired transceiver 14 as shown in FIG. 2 and operate in accordance with Flowchart 1. The system contains a base unit 21 that has communication circuitry 22 for allowing the PLs 11 to send and receive digital communications from the base unit 21 using an RS-485 serial link 27. Communication circuitry 22 also receives audio and tracking 19 signals from the keypads if these options are used. Base unit 21 is configured to control camera 23 and lens 24 and contains an audio output 25, an RS-232 communication port 26 and configuration switches (not shown).

Figure 18:
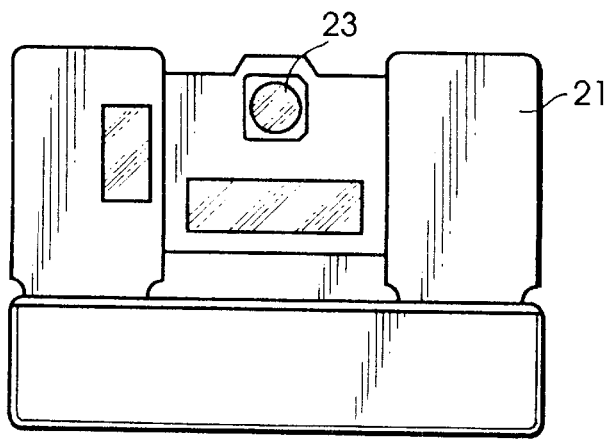
FIG. 18 is a front elevational view of a base unit in accord with the present invention with an integral camera.

The system 10 setup is accomplished by setting the base unit 21 address on the communication bus 27 using the RS-232 port 26 and a computer or similar device with a compatible port. This base unit 21 address also represents the selected camera 23 address, the camera 23 being mounted on or an integral part of base unit 21 (FIG. 18). Next, each PL 11 is programmed via the keypad 19 to have a unique bus address. Then, the base unit 21 and camera 23 bus address that is to be controlled by the PL 11 is entered from the keypad 19. The selected camera's field of view variables, PAN, TILT, ZOOM, FOCUS and/or IMAGE (LIGHT/DARK) [IRIS, SHUTTER SPEED, GAIN, WHITE BALANCE] would then be adjusted from the PL 11 using the button switches 37–44. The next step is to issue a command to store the variable settings from the PL 11. The procedure for the PL 11 setup is outlined in Flowchart 2. Each PL 11 in the system is setup in the same manner.

When a user wants to display the stored field of view, the PL 11 switch or MY TURN button 41 is pressed on the keypad 19. Base unit 21 receives the command from the PL 11 to position the camera 23 and its lens 24 to produce the desired pre-programmed field of view. When another user wishes to take the floor, the MY TURN button 41 is pressed on the other's PL 11 and the system recalls the pre-programmed field of view for such other user. The keypads 19 also contain an ALL button 42 which causes the system to select another pre-programmed field of view, The ALL VIEW is programmed using the procedure outlined in Flowchart 3 and is accessible to any keypad 19 of PL 11. This basic system operation is detailed in Flowchart 4.

Figure 4:
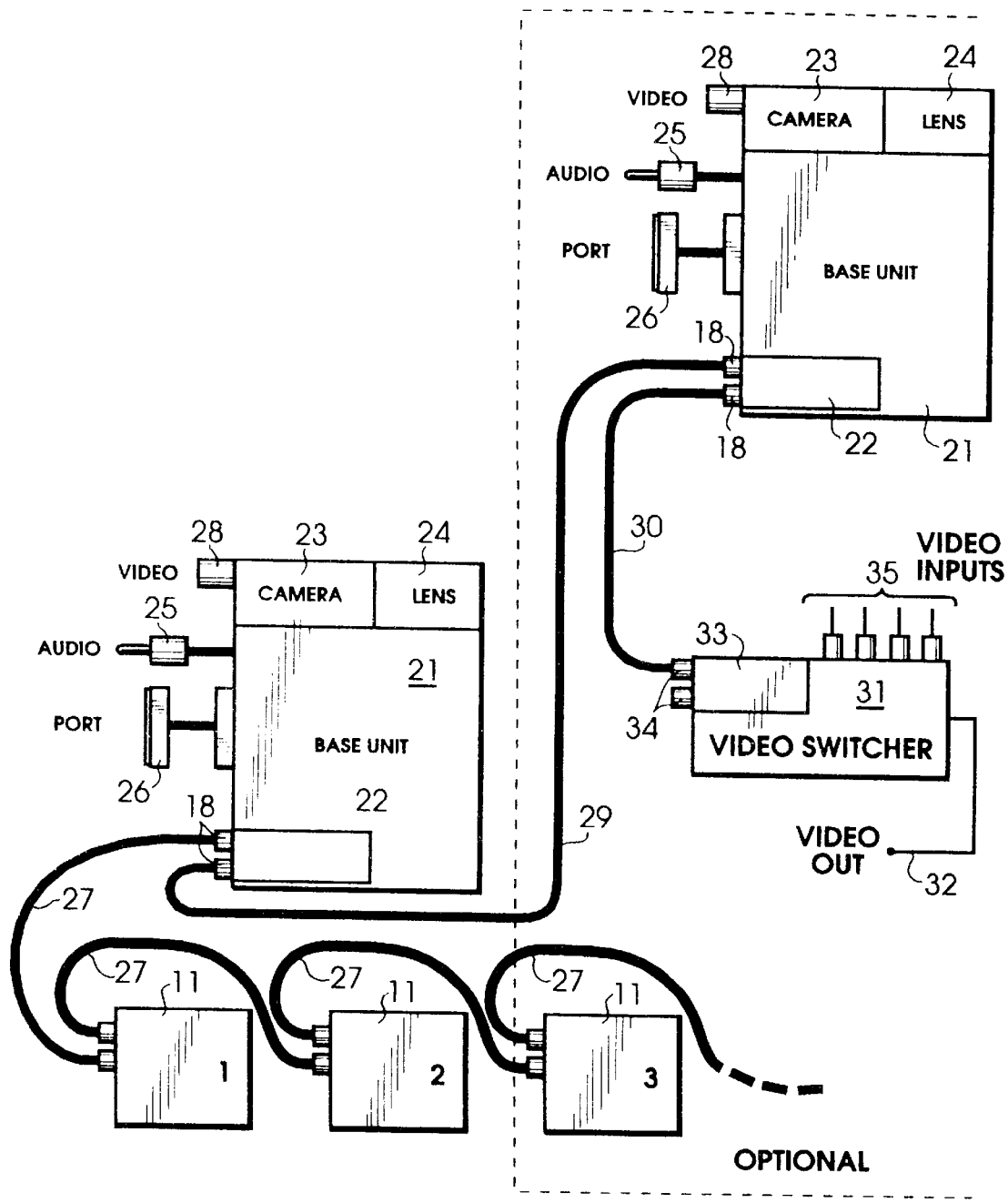
FIG. 4 is a block diagram of another embodiment of the system of the present invention.

FIG. 4 is a diagram of the system 10' with the addition of a video switcher 31 responsive to commands and a second base unit 21 and camera 23. The camera video outputs 28 are connected to the video inputs 35 of the video switcher 31. When a locator or MY TURN button 41 is pressed, the PL keypad 19 issues the appropriate system commands to recall the desired field of view of the selected camera 23. Along with the aforementioned commands, the PLs 11 automatically issue commands to the base unit 21 which in turn issue the commands to video switcher 31 to route the selected camera video to the system video output 28 at the appropriate time (see Flowchart 4). The video switcher 31, such as the one employed in this system is also capable of a picture-in-picture display. This system may also be programmed to automatically display the selected camera video as the main display and another field of view, computer screen, whiteboard, etc., such as the picture-in-picture.

This system has provisions for a "master" PL keypad 19 that is capable of issuing lockout commands to the other keypads 19 on the communication bus 27. Any PL 11 can be configured to be a master by using the program switch 36 and button keypad 19 on the PL 11 (see Flowchart 5). Employing a hierarchical address format, the system uses the keypad 19 addresses to determine priority, meaning that the master keypad 19 is addressed above its slaves. When a master MY TURN button 41 is pressed, the system 10 displays the master's pre-programmed field of view and locks out all of the PL 11 slaves addressed below the master. When the master keypad's MY TURN button 41 is pressed again, all of the PL slaves addressed below the master are released (see Flowchart 6). This arrangement allows the system to support multiple master PLs 11 in a user configurable format. The master PL 11 with the highest address is the overall system master and can "lockout" all other master and slave keypads 19 on the RS-485 bus 27.

The keypad 19 of PL 11 can also issue lock and unlock commands only. These commands are not linked to a predetermined field of view and can be issued by any keypad configured as a master by pressing the MY TURN and ALL buttons 41,42 simultaneously. Pressing these buttons 41, 42 again toggles the lock status of the keypads 19 addressed below the master.

As understood in digital communications, the present invention is in a system command format which provides bits for (1) destination address for the specific base unit 21; (2) source address for the specific PL 11 that is sending a command; (3) a length-of-packet bit; (4) command bits; (5) data bits; and (6) two cyclic redundancy checks as known standards.

Autotrack Options

The PL keypad 19 can be configured to support automatic tracking or autotracking. This feature provides for automatic subject location in the area. To setup an autotracking keypad 19, a base unit 21 is selected and placed in the autotrack mode by pressing the MY TURN button 41 on the keypad. The base unit 21 then tracks the keypad 19 and the user adjusts the desired field of view of the camera 23 using the zoom, focus, iris, framing, and tracking windows commands. The store command is then sent to the appropriate devices from the PL 11 when the MY TURN button 41 is pressed for 3 seconds. When the user issues the MY TURN command, the selected base unit 21 will locate and place the user in the desired field of view whatever location the user is situated in the area.

The PLs 11 can be configured to issue several types of autotrack commands when the MY TURN button 41 is pressed. The specific autotrack command is determined by the keypad 19 setup. When the first type (Type 1) of autotrack command is issued from the PL 11 the system invokes autotrack on the selected base unit 21, locates and places the user in the desired field of view, and then ceases to autotrack (see Flowchart 7). A Type 2 command enables autotrack, places the user in the desired field of view and continues to autotrack the PL 11 movements as long as the MY TURN button 41 is pressed (see Flowchart 8). Type 3 engages autotrack as before, puts the user in the desired field of view, and continues to autotrack until another autotrack command is issued by another PL 11. If the same PL 11 issues the MY TURN command, autotrack is toggled off. If another PL 11 MY TURN button 41 is pressed, the system autotracks the latter PL 11 (see Flowchart 9).

Audio Options

Each PL keypad 19 can contain audio circuitry 16. The micro-controller 12 has an electronic switch to enable/disable the local keypad audio signal creating a multiple of operating options. The first audio option configures the system to enable all keypad audio inputs continuously, giving the system audio output 25 (FIG. 3) the summation of the audio signals of each keypad 19. A second option allows the system to enable the audio from active field of view keypad 19 only, while disabling all other keypads 19. With only one audio input active, true sound-at-the-source is produced. A third option enables audio inputs by address range. In this configuration, selected groups of users could speak and be heard simultaneously. The groups would be determined by the active field of view keypad 19 address and an associated pre-programmed address range.

In both the tracking/distance and audio options the PLs 11 being used will have the appropriate keypad 19 and indicating lights 19' as needed.

Figure 15:
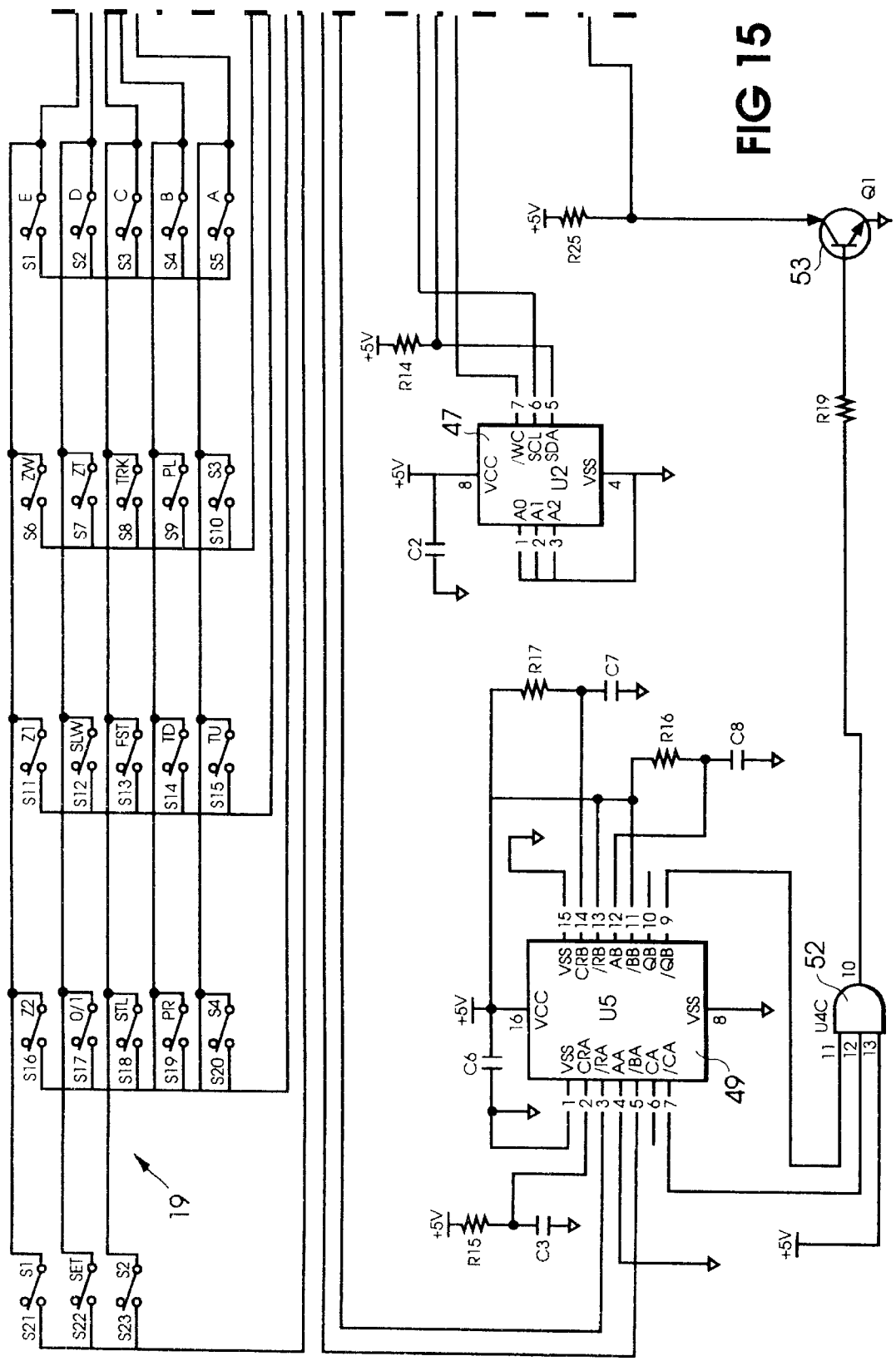
Figure 15A:
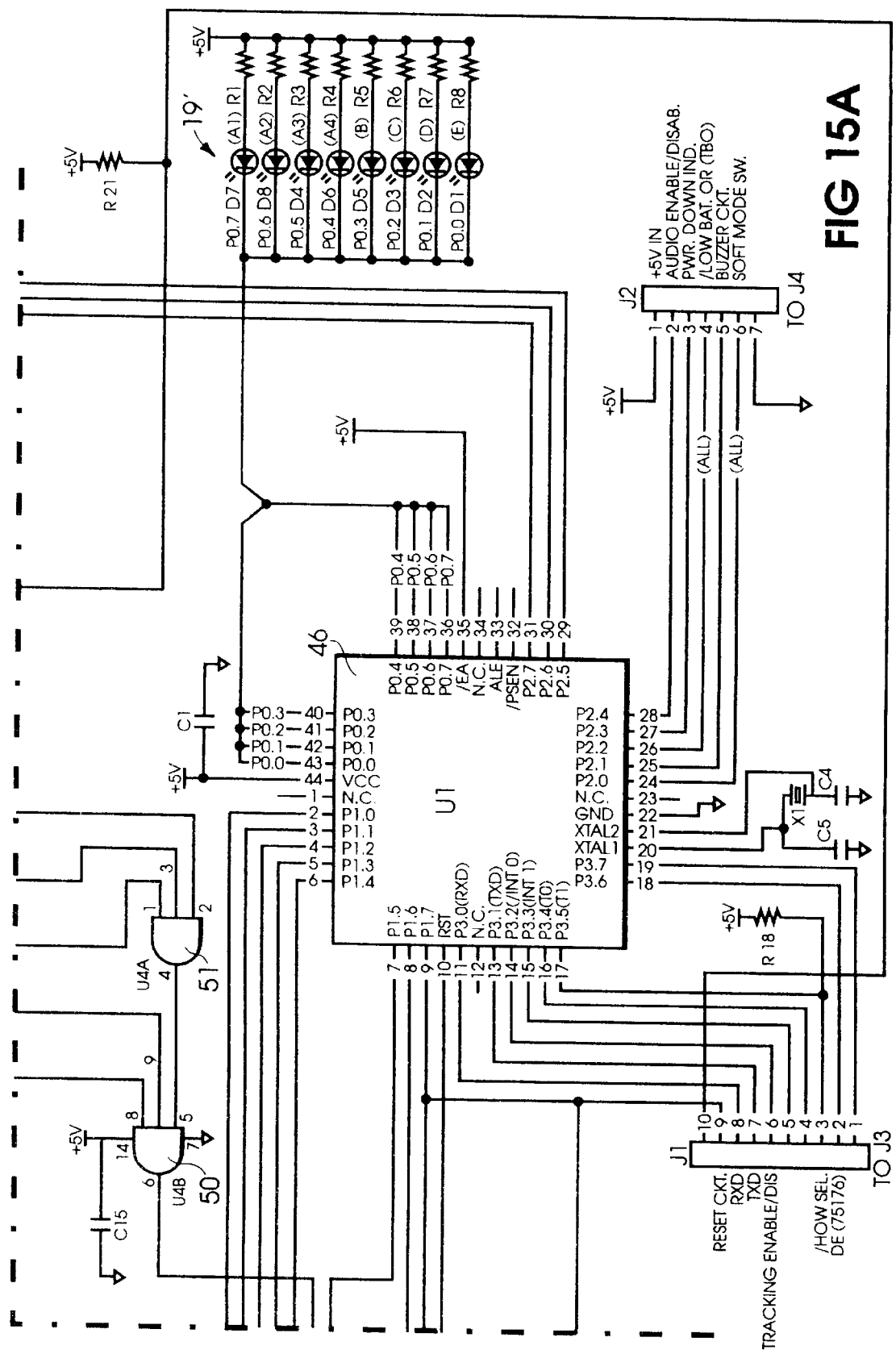
Figure 15B:
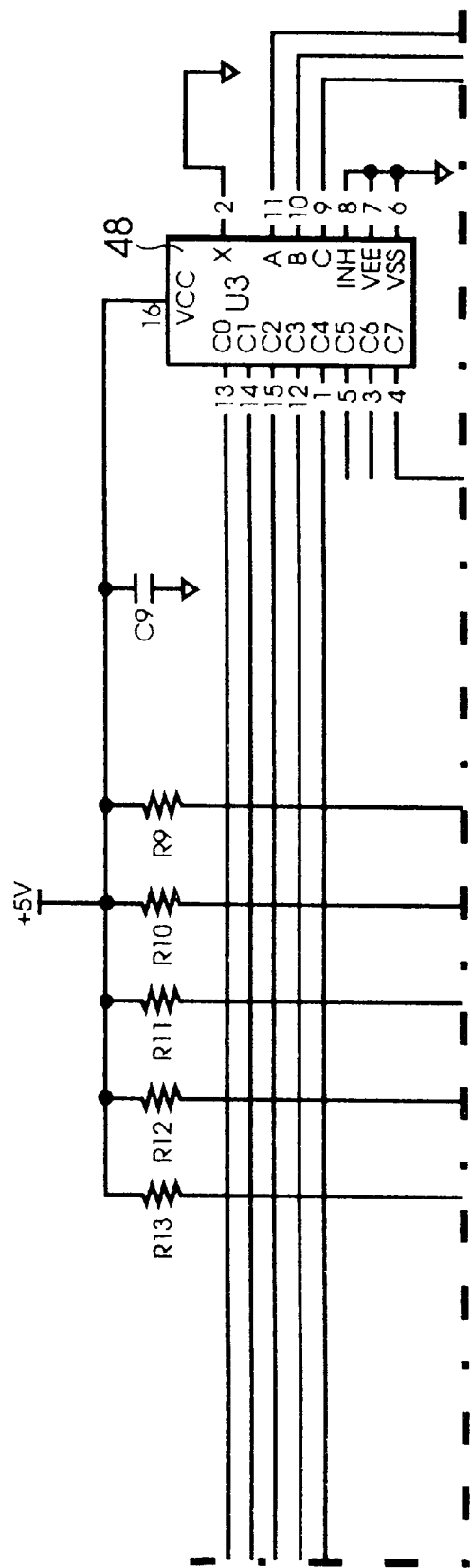

FIGS. 15 and 16 represent schematics of the basic electronic circuitry used in all PL devices. A switch bank provides that the keypad 19 include as many as 23 switches for use in operation. Indicating lights 19' are 8 in number. The number of switches in a keypad 19 and lights in the indication 19' actually used depend upon the specific PL 11 that is being used. The chips 46–52 are all conventional devices known to the art and include microcomputer 12 (U1) NV RAM (U2); switch multiplexer (U3); and power up/reset (U5). Coupling circuit 53 is also standard. In FIG. 16 59 is a standard RS-485 transceiver. Mic 54 output is controlled by switch 55. IR output is controlled via switch 58. Power is controlled via switch 56.

The IR tracking/distance option 17 includes as many detectors 57 and associated circuits as are necessary in the circumstances.

Figure 17:
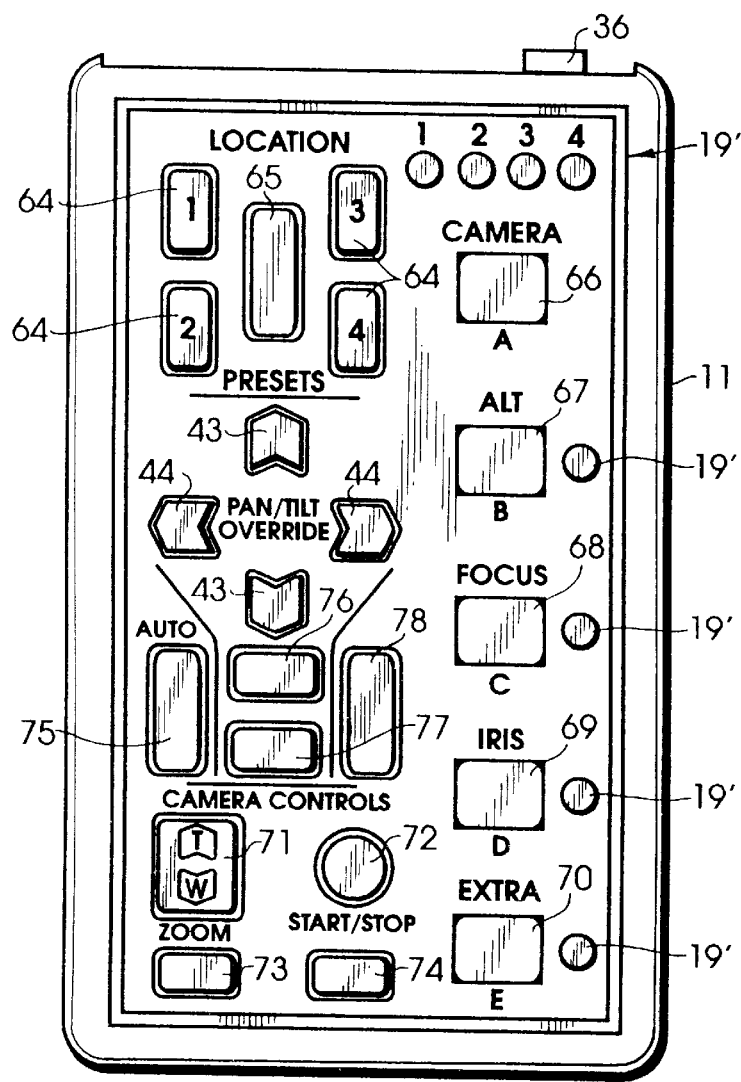
FIG. 17 is a front elevational view of another embodiment of the personal locator in accord with the present invention.

FIG. 17 includes a director's PL 11 that utilizes the full capability of the PL 11 electronics of FIGS. 5, 15 and 16. This device is substantially similar to the device in copending application Ser. No. 08/078,434 referenced above.

Location preset buttons 64 are 4 in number (but not limited to 4) and are used with SET switch 65 to establish four preset locations in the device memory. Switches 66–70 are used in programming the system or 10'. Switch 71 is a conventional ZOOM rocker switch. START/STOP switch and Z1 and Z2 switches 73 and 74 are also used in programming. Autotrack switch 75, FAST and SLOW switches and STEALTH switch are as discussed in the copending application Ser. No. 08/078,434.

It is important to note that the optical functions discussed hereinabove can be dealt with electronically in some CCD cameras. One of the principal objectives of the present invention is multi-user control of the field of view of one or more cameras. The field of view or frame represents the selectable portion of the total image physically available to a camera that is supplied as an output by the camera. That is, not everything within the physical range of a camera lens is necessarily "seen" by the camera at a particular time and camera lens setting and thus cannot be supplied as an output from the camera. The use of "zoom functions" that may require changes in the optical magnification of the camera lens is a case in point. The movement of a ZOOM lens into a "tighter" shot results in significantly less image "seen" by the camera with respect to the total image physically available at other lens positions. Also, the field of view of a camera changes with position as is the case in the present system when the automatic tracking option is in use. The objective is to control all the variables that define the field of view from (1) position in the PAN and TILT planes to (2) camera control, such as ZOOM, FOCUS, IRIS, SHUTTER, GAIN, WHITE BALANCE, and to include the control of these variables of the system.

With reference again to FIG. 1, IMAGE switches 39 and 40 are programmed for use with other keypad 19 switches to provide for control of the iris, focus, shutter speed, gain and white balance variables of the associated camera 23. (As shown clearly in Table I).

TABLE I

Zoom*

Zoom Telephoto
Zoom Wide
Zoom Stop
Zoom Position
Zoom Speed
Focus*

Focus Near
Focus Far
Focus Stop
Focus Position
Focus Speed
Focus Manual
Focus Auto
Iris*

Iris Manual
Iris Auto
Iris Position
Iris Speed
Shutter*

Shutter Speed
Shutter Speed Manual
Shutter Speed Auto
Gain*

Gain −12db
Gain −6db
Gain −3db
Gain 0db
Gain +3db
Gain +6db
Gain +12db
Gain +18db
Gain Manual
Gain Auto
White Balance*

White Balance Manual
White Balance Auto
White Balance Indoor
White Balance Fluorescent
White Balance Outdoor
White Balance Position

*Camera Image Variables

In one embodiment of the PL 11, a master override switch 60 is provided along with an associated indicating light 61.

While the invention has been described with respect to certain specific embodiments it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the U.S. is:

1. A method of controlling the field of view of a camera in an automatic tracking system to track a movable target including a camera with a field of view that includes means for controlling the field of view of a camera by controlling the variables that define the field of view to automatically track one of at least two targets for controlling the field of view of the camera comprising the steps of:

A. manually issuing a command to track a target;
   B. receiving by the automatic tracking system the command of step A;
   C. controlling the field of view to automatically track the target of step A such that movements of the target in step A are automatically tracked by the field of view of the camera;
   D. manually issuing a subsequent command to track another target;
   E. receiving by the automatic tracking system the command of step D; and
   F. controlling the field of view to automatically stop tracking the target of step A being tracked in step C and to begin tracking the another target of step D such that movements of the another target of step D are automatically tracked by the field of view of the camera.

2. The method of claim 1 further including the steps of:
   G. controlling the variables that define the field of view of the camera to associate the variables with each of the at least two targets to be automatically tracked; and
   H. automatically controlling the variables to be those variables associated with the target to be tracked.

3. The method of claim 1 further including the steps of:
   G. associating with one or more targets to be automatically tracked a means for transmitting audio; and
   H. automatically selecting which audio means is selected to be the audio means for the automatic tracking system.

4. The method of claim 3 further including the step of:
   I. automatically selecting the audio associated with the target that is automatically tracked in step C.

5. The method of claim 4 further including the step of:
   J. automatically disabling the audio associated with all other targets not being tracked.

6. A method of controlling the field of view of any camera included in an automatic control system for controlling the field of view of any camera and for receiving commands to enable the field of view of any camera to be controlled comprising the steps of:

A. providing two or more manually actuatable remote control devices capable of issuing by each of users of such devices one or more commands to the automatic control system.
   B. associating each remote control device with one or more selected values of one or more variables from the following list which defines field of view control of any camera by the automatic control system to create a field of view unique to each remote control device:
      a. field of view position variables,
      b. field of view perspective variables,
      c. camera imaging variables,
      d. automatic control system variables;
   C. manually issuing a command by the user to the automatic control system and that is identifiable by the automatic control system as being one of the unique field of views of step B; and D. automatically controlling the field of view of one of any camera using the values associated with the command of step C.

7. The method of claim 6 wherein step B includes the step of:

E. generating the association of a selected control device with the one or more selected values by manually issuing a command from the selected remote control device.

8. The method of claim 6 wherein step C includes the step of:

E. manually issuing the command from an associated remote control device of step B.

9. The method of claim 6 wherein step b includes the step of:

E. defining the field of view position variables as including the position of the field of view in one or more planes.

10. The method of claim 6 wherein step B includes the step of:

E. defining the field of view perspective variables as including the zoom perspective of the field of view.

11. The method of claim 6 wherein step B includes the step of:

E. defining the camera imaging variables as including the resulting image brightness of the field of view image.

12. The method of claim 6 further including the steps of:

E. providing means of automatically tracking a target with the field of view of the camera; and F. defining the automatic control system variables as including values from one or more variables on the following list:
  a. target tracking enable variables,
  b. target location relative to the field of view variables,
  c. tracking response variables.

13. The method of claim 12 further including the step of:

G. defining the target tracking enable variables as including the commanding of the automatic control system to automatically track a target for as long as a command is being issued.

14. The method of claim 12 further including the step of:

G. further defining the target tracking enable variables as including the commanding of the automatic control system to automatically track a target continuously after a command is issued.

15. The method of claim 14 further including the step of:

H. tracking a different target with the field of view than the target being tracked in step G upon the issuance of a command to track the different target.

16. The method of claim 12 further including the step of:

G. defining the target tracking enable variables as including the commanding of the automatic control system to automatically track a target until the difference between the actual location of the target relative to the field of view and the desired location of the target relative to the field of view is at a predetermined value; and H. ceasing the tracking of the target when the predetermined value of step G occurs.

17. The method of claim 6 wherein step B includes the step of:

F. providing means of selecting a camera video output from any of the cameras included in the automatic control system; and G. defining the automatic control system variables as including the automatic selection of the camera video output from any camera included in the automatic control system.

18. The method of claim 17 further including the step of:

H. associating a camera video output as a variable that defines the unique field of view of step B; and I. automatically selecting the video output of a camera when the associated unique field of view is recalled in step C.

19. The method of claim 6 wherein step B includes the step of:

F. providing means of associating an audio signal with at least one remote control device; and G. defining the automatic control system variables as including the selection of any of one or more audio signals to be associated with a unique field of view.

20. The method of claim 19 wherein step F includes the step of:

H. selecting one or more audio signals associated with the unique field of view.

21. The method of claim 20 wherein step G includes the step of:

I. disabling the audio signals that are not associated with the unique field of view.

22. The method of claim 6 further including the step of:

E. manually issuing a command to provide that the automatic control system will not respond to subsequent commands from other remote control devices.

23. The method of claim 22 further including the step of:

F. issuing a command to restore the capability of the automatic control system to respond to subsequent commands from other remote control devices.

24. The method of claim 6 further including the steps of:

E. associating for all remote control devices selected values from one or more different variables from the list of step B such that the selected values represent a unique field of view common to all remote control devices; and F. manually issuing a command by any remote control device to recall the values of step E.

25. A method of controlling the field of view of a camera included in an automatic control system for controlling the field of view of a camera and for receiving commands to enable the field of view of a camera to be controlled comprising the steps of:

A. providing manually operable means capable of issuing commands to the automatic control system;

B. providing means of selecting one target between two or more targets for which the camera field of view will be controlled;

C. remembering by the automatic control system for each target one or more selected values from one or more variables from the following list which defines field of view control of a camera by the automatic control system to create a field of view unique to each target;
  a. field of view position variables,
  b. field of view perspective variables,
  c. camera imaging variables,
  d. automatic tracking variables;

D. manually issuing a command that is identifiable by the automatic control system as being one of the unique field of views of step C; and E. automatically controlling the field of view of one of a camera using the values that were associated with the target in step C for the target selected in step D.

26. The method of claim 25 wherein step D includes the step of:
F. manually issuing the command by a control device to provide for automatic tracking of the control device.

27. The method of claim 25 wherein step D includes the step of:
F. manually issuing a command by a target from a remote control device to provide the automatic tracking of the target only for as long as the command is being continuously issued.

28. The method of claim 25 wherein step D includes the step of:
F. manually issuing a command by another target from a remote control device to provide for automatic tracking of the other target and the cessation of automatic tracking of the one subject.

29. The method of claim 25 wherein step F includes the steps of:
G. ceasing the automatic tracking of the target that issued the command when the tracking system has moved to the desired location with the field of view of the camera relative to the target.

30. The method of claim 26 wherein step E includes the step of:
G. changing the field of view to the field of view for the control device that issued the command for tracking.

31. The method of claim 26 further including the step of:
G. manually issuing a command to override subsequent commands affecting the control of the field of view of the camera.

32. The method of claim 31 further including the step of:
H. manually issuing a command to restore the responsive capability of the means for controlling the field of view to commands received.

33. The method of claim 25 further including the steps of:
G. remembering field of view variables for the target being tracked; and
H. recalling remembered variables when the subject is being automatically tracked.

34. The method of claim 25 further including the step of:
F. remembering variables associated with control of the automatic tracking of the subject.

35. The method of claim 34 wherein step E includes the step of:
G. remembering the location in the field of view that the target is to be maintained during automatic tracking of the target.

36. A method of controlling the field of view of any camera included in an automatic control system for controlling the field of view of any camera to automatically track with the field of view of one of two or more movable targets and for receiving commands to enable the field of view of any camera to be controlled comprising the steps of:
A. providing a manual means issuing commands to the automatic control system;
B. providing a means of selecting one of the two or more targets the camera field of view will automatically track such that movements of the target that are automatically tracked by the camera field of view;
C. providing means of associating for each of the two or more targets one or more selected values from one or more variables from the following list which defines field of view control of a camera by the automatic control system for the automatic tracking of each target:
  a. field of view position variables,
  b. field of view perspective variables,
  c. camera imaging variables,
  d. automatic tracking system variables,
  e. automatic control system variables;
D. manually issuing a command that is identifiable by the automatic control system as selecting one of the targets of step B to be automatically tracked; and
E. automatically controlling the field of view of a camera to track the target of step D using the associated values of step C.

37. The method of claim 36 wherein step C further includes the step of:
F. further defining automatic tracking system variables as being selected from one or more values of the following list:
  a. tracking response variables,
  b. location of the target during automatic tracking relative to the field of view position variables, and
  c. zoom perspective relative to the location of the target relative to the field of view variables.

38. The method of claim 36 wherein step B includes the step of:
F. selecting the one target to be automatically tracked by issuing a command to the automatic control system.

39. The method of claim 38 wherein step F includes the step of:
G. manually issuing the command by the target that will be automatically tracked.

40. The method of claim 37 wherein step F includes the step of;
G. defining automatic tracking system variables to include automatically tracking the target until the desired location of the target relative to the field of view is achieved and then causing the cessation of automatic tracking.

41. The method of claim 37 wherein step F includes the step of:
G. defining automatic tracking system variables to include automatically tracking the target only for as long as the command of step D is being issued.

42. The method of claim 37 wherein step F includes the step of:
G. defining the automatic tracking system variables to include continuously tracking the target after the command of step D has been issued.

43. The method of claim 36 further including the step of:
F. tracking the target from the command of step D until another command is issued to track a different target and then causing the cessation of automatic tracking of the target of step D and the automatic tracking of the different subject.

44. The method of claim 36 further including the steps of:
F. providing for each camera included in the automatic control system a video output signal; and
G. defining the automatic control system variables to include the automatic selection of the camera video output from any camera in the automatic control system.

45. The method of claim 44 further including the steps of:
H. associating for each target a camera; and
I. automatically selecting the video output signal from the camera associated with the target of step H.

46. The method of claim 37 wherein step F includes the step of:
G. further defining tracking response variables as those variables which establish the rate at which the field of view tracks the target.

47. The method of claim 37 wherein step F includes the step of:

G. further defining the location of the target during automatic tracking relative to the field of view position variables as those variables that establish the location relative to the field of view that the target will be maintained during automatic tracking of the target.

48. The method of claim 37 wherein step F includes the step of:

G. further defining the zoom perspective relative to the location of the target relative to the field of view variables as those variables that establish the zoom perspective to maintain the target at a desired perspective relative to the field of view of the camera.

49. The method of claim 36 wherein step C includes the step of:

P. further defining camera imaging variables as those variables that define the resulting image brightness of the field of view image.

50. The method of claim 36 further including the step of:

F. providing means of associating an audio signal with at least one of the targets that can be automatically tracked; and G. defining the automatic control system variables to include the selection of any of one or more audio signals to be associated with the target that is automatically tracked.

51. The method of claim 50 further including the step of:

H. selecting the one or more audio signals that are associated with the target selected to be automatically tracked by the field of view.

52. The method of claim 51 further including the step of:

I. disabling the audio signals that are not associated, with the target being automatically tracked.

53. The method of claim 36 further including the step of:

F. manually issuing a command from a device to provide that the automatic control system will not respond to subsequent commands from other devices.

54. The method of claim 53 further including the step of:

G. manually issuing a command to restore the capability of the automatic control system to respond to subsequent commands from other devices.

55. The method of claim 36 further including the step of:

F. associating for all targets selected values from one or more variables from the list of step C such that the selected values represent a unique field of view common to all targets when can be recalled upon the issuance of a command; and G. manually issuing a command by any target to recall the values of step F.

* * * * *